(12) United States Patent
Carbonell Puig (10) Patent No.: US 9,096,015 B2
(45) Date of Patent: Aug. 4, 2015

(54) METHOD FOR CREATING AN OVERLAP BY SHEET WELDING

(76) Inventor: Jordi Carbonell Puig, Barcelona (ES)

( * ) Notice: Subject to any disclaimer, the term of this patent is extended or adjusted under 35 U.S.C. 154(b) by 95 days.

(21) Appl. No.: 13/977,575

(22) PCT Filed: Jan. 7, 2011

(86) PCT No.: PCT/ES2011/070007
§ 371 (c)(1),
(2), (4) Date: Sep. 12, 2013

(87) PCT Pub. No.: WO2012/093185
PCT Pub. Date: Jul. 12, 2012

(65) Prior Publication Data
US 2013/0340917 A1    Dec. 26, 2013

(51) Int. Cl.
| | |
|---|---|
| *B31F 5/00* | (2006.01) |
| *B29C 65/02* | (2006.01) |
| *B29C 65/10* | (2006.01) |
| *B29C 65/14* | (2006.01) |
| *B29C 65/18* | (2006.01) |
| *B29C 65/22* | (2006.01) |
| *B29C 65/00* | (2006.01) |
| *E06B 9/42* | (2006.01) |
| *B29L 31/00* | (2006.01) |

(52) U.S. Cl.
CPC ............... *B29C 65/02* (2013.01); *B29C 65/10* (2013.01); *B29C 65/1412* (2013.01); *B29C 65/1467* (2013.01); *B29C 65/18* (2013.01); *B29C 65/224* (2013.01); *B29C 66/1122* (2013.01); *B29C 66/3474* (2013.01); *B29C 66/43* (2013.01); *B29C 66/431* (2013.01); *B29C 66/73921* (2013.01); *B29C 66/8362* (2013.01); *B29C 66/91413* (2013.01); *B29C 66/91921* (2013.01); *B29C 66/91931* (2013.01); *B29C 66/91935* (2013.01); *E06B 9/42* (2013.01); *B29C 65/103* (2013.01); *B29C 66/71* (2013.01); *B29C 66/8122* (2013.01); *B29C 66/81455* (2013.01); *B29C 66/81457* (2013.01); *B29C 66/81871* (2013.01); *B29C 66/83221* (2013.01); *B29C 66/9161* (2013.01); *B29C 66/91423* (2013.01); *B29L 2031/719* (2013.01); *Y10T 156/10* (2015.01)

(58) Field of Classification Search
CPC ........ B29C 65/00; B29C 65/74; B29C 65/02; B29C 65/022; B29C 65/1632
USPC ................................. 156/157, 502, 711, 752
See application file for complete search history.

(56) References Cited

U.S. PATENT DOCUMENTS

| | | |
|---|---|---|
| 2,367,725 A | 2/1943 | Lindh et al. |
| 3,402,089 A | 9/1968 | Seaman |
| 2009/0032166 A1 | 2/2009 | Aoshima |

FOREIGN PATENT DOCUMENTS

| | | |
|---|---|---|
| EP | 1083270 A2 | 3/2001 |
| EP | 2087989 A2 | 8/2009 |
| EP | 2298538 A2 | 3/2011 |
| GB | 565592 A | 11/1944 |
| GB | 1376324 | 12/1974 |
| GB | 2450366 A | 12/2008 |
| WO | 0136778 A1 | 5/2001 |

OTHER PUBLICATIONS

PCT/ES2011/070007 International Search Report mailed Sep. 28, 2011.

*Primary Examiner* — Mark A Osele
*Assistant Examiner* — Nickolas Harm
(74) *Attorney, Agent, or Firm* — Kunzler Law Group, PC (57) ABSTRACT

The present invention relates to a method and apparatus for forming overlaps by welding a main sheet 2 and an additional sheet 5. The welding takes place by heating the contact area, which is made of a thermoplastic material, to a melting temperature, and it is based on performing differentiated heating on each of the outer surfaces 4,7 of the sheets 2,5.

4 Claims, 5 Drawing Sheets

METHOD FOR CREATING AN OVERLAP BY SHEET WELDING

OBJECT AND TECHNICAL FIELD OF THE INVENTION

The object of the present invention is to provide a method and apparatus for forming overlaps by welding sheets.

The concept of "sheet" also includes herein the concepts of film, board, plate and fabric. The concept of "welding" includes the concepts of sealing and joining.

"Overlapping" is understood herein by the overlay of sheets (one on top of the other) joined through respective contact surfaces.

Overlapping by welding occurs by heating thermoplastic material arranged in or between the contact surfaces of the sheets, with or without applying pressure between them, such that the heating leads to the melting of said thermoplastic material and accordingly to the overlapping of the sheets. The method and the apparatus of the invention are especially applied, but without limitation, to roller shades. Such shades are characterized in that they incorporate a counterweight placed inside a hem made in the bottom part of the shade which serves to aid in rolling up and extending the shade as well as to prevent the formation of creases when the shade is extended. The present invention specifically applies to forming the overlap by welding the hem of roller shades and/or attachments. However, the method and apparatus of the invention described below generally applies to the manufacture of any other type of shades, awnings, parasols, canvases for covering facades, etc., and for obtaining reinforcement bands, protective side edging therein and plastic section or zipper attachments.

BACKGROUND OF THE INVENTION

Different overlapping techniques by welding sheets of thermoplastic material are well known. The known techniques can be classified into two large groups: dielectric welding (also called high-frequency welding) and heat welding. Overlapping by dielectric welding is based on applying a high frequency alternating voltage (of the order of 10 MHz) between two plates (electrodes) and between which the sheets to be welded are located. Said voltage causes the sheets to vibrate at molecular level with the subsequent temperature increase for melting said sheets until reaching the melting temperature in the material of the contact area. Then, usually by additionally applying compression to the sheets and after cooling them, overlapping by welding normally takes place.

In contrast, in overlapping by heat welding, said heating is through heat conduction heat (e.g. by means of contact with a hot surface or blowing hot air) or heat radiation (e.g. by infrared) transfer means. To that end, one of the outer surfaces of the sheets or both outer surfaces at the same time to be welded are heated by heat transfer from a heat source. The heat transfer occurs during the time needed to reach the melting temperature in the material of the contact surfaces of the sheets. Then, usually by additionally applying compression between the sheets and similar to the prior art, the overlap is formed by welding after cooling them.

The technique most commonly used to date for forming overlaps by welding sheets of thermoplastic material is high-frequency welding. This is because of its considerable advantage over the other technique in terms of speed. The reason is that dielectric heating takes place from the contact area of the sheets outwards, so the melting of the material of the contact area takes place very quickly.

On the other hand, a drawback of the dielectric heating technique is that it cannot be suitably applied to any type of thermoplastic materials. The characteristic of thermoplastic materials indicating their ease in being welded with dielectric heating is the so-called dielectric loss factor. Thermoplastics with a high dielectric loss factor, such as PVC or PU for example, are easily weldable with dielectric heating. However, thermoplastics such as PTFE (Teflon®), which have a low dielectric loss factor, cannot be suitably welded with dielectric heating. PTFE is commonly used as an electrical insulation material so the heat welding technique can be useful for welding sheets of PTFE having said use.

Generally, both conventional overlap dielectric welding and heat welding techniques present the following technical problem.

When the overlap by heat welding technique is applied, if the heat source acts on a single outer surface, taking into account that the melting temperature must be reached in the contact area, to that end the temperature in the outer surface must be significantly higher, this excess temperature can lead to overheating the material of the outer surface and therefore to degradation thereof. Furthermore, this case further has the added problem that the welding process consumes a relatively excessive amount of time as the heat source acts on a single outer surface. If in contrast the heat source is applied to the two outer surfaces, the temperature of said surfaces will also be increased to reach the melting temperature in the contact area and subsequently the technical and aesthetic characteristics or properties of the outer surfaces will be able to be altered.

An example of alteration (without reaching degradation) of the technical and aesthetic characteristics and properties of the outer surfaces of sheets overlapped by welding can be seen in roller shades. As mentioned, such shades are characterized in that they incorporate a hem and/or joint to which an overlap is applied by welding. In this particular case, the application of the conventional dielectric welding technique usually causes deterioration of the outer surfaces of the shade in the area of the overlap. This deterioration becomes apparent in that the shade in said area is no longer translucent, changing in color, tone, roughness and gloss such that it debases the visual and aesthetic aspect of the shade as a whole.

Generally, temperature can alter technical and aesthetic characteristics and properties of the outer surfaces and of the overlap; such technical properties include mechanical properties (e.g. tensile strength of the overlap, hardness or roughness of the surfaces), physical properties (e.g. electrical conductivity), chemical properties (e.g. water resistance), etc. and aesthetic properties including color, tone, roughness, gloss, etc. The present invention attempts to provide a method and apparatus for forming overlaps by welding sheets such that the technical and aesthetic characteristics or properties thereof do not significantly vary on at least one of the outer surfaces, being particularly useful for manufacturing roller shades, awnings, parasols, canvases for covering facades, etc.

DESCRIPTION OF THE INVENTION

For the purpose of solving the indicated technical problem and achieving improvements with respect to the methods and apparatuses for forming overlaps by welding sheets known in the state of the art, the proposed invention provides the technical features and effects described below.

Considering the scope of the invention, the following concepts in relation to the temperature for forming overlaps by welding sheets are defined. Main sheet critical temperature is understood as the maximum temperature which the main sheet outer surface must have so that its technical and aesthetic characteristics or properties are not altered. The main sheet softening temperature is a particular case of critical temperature such that if said temperature is exceeded, the material of the outer surface starts to soften without actually melting. The minimum melting temperature (TMm) of a material is defined as the minimum temperature at which the material melts. The maximum melting temperature (TFM) of a material is defined as the maximum temperature the material must have to not experience degradation due to overheating. The main sheet critical temperature (TC), including the softening temperature, generally depends on the type of material and thickness or grammage of the sheet. It can also even depend on the color because depending on the required finish, for example, some colors may not be affected by the visual aspect. Approximate numerical examples of normal values for the case of roller shades but not limited to them are the following: TFM=160° C., TMm=110° C. and TC=60° C.

The method for forming an overlap by welding between a main sheet and an additional sheet according to the object of the invention is characterized in that: the main sheet outer surface is heated to a temperature comprised within the temperature range that is higher than ambient temperature and less than or equal to the main sheet critical temperature; and the outer surface of the additional sheet is heated to a temperature that is higher than the heating temperature of the main sheet outer surface, preferably higher than the main sheet critical temperature, and suitable for melting the material of the contact area and accordingly joining the sheets in a heating time. In particular, the additional sheet outer surface is subjected to a temperature comprised within the temperature range that is higher than or equal to the minimum melting temperature of the material of the contact area and less than the maximum melting temperature of the material of the contact area. The main sheet critical temperature can also be the softening temperature of the material of the main sheet outer surface.

With respect to the concept of ambient temperature (TA), it is considered the mean temperature of the environment or atmosphere surrounding the outer surfaces of the main and additional sheets (and also the temperature for melting same) before applying the method for forming the overlap by welding described in the preceding paragraph. The case of the outer surfaces being able to have a higher ambient temperature as the result of a heating that may have taken place prior to applying the welding is contemplated. In this sense, it is considered that raising the ambient temperature could introduce an improvement in the heating power consumption which could be significant, for example, in forming a series of welds with the same apparatus.

The contact area can be formed by either contact surfaces of the main and additional sheets or by a foreign element made of thermoplastic material interposed between the sheets, such as a contact sheet made of thermoplastic material for example. The latter allows applying the invention without restriction to main and additional sheets of material made of any type of material, not only of thermoplastic material, particularly of a natural fiber textile material (e.g. cotton, wool). If the main and/or additional sheets are made of a textile material, adhesion takes place due to migration of the thermoplastic material from the contact area towards the natural fibers.

Additionally, both the main sheet and the additional sheet can comprise more than one layer of different materials forming a laminate. For example, the layers can be made of a plastic or textile material. The layers of each sheet can be attached to one another by conventional attachment means such as: adhesive, sewing, riveting, welding, etc. It is also contemplated that the main and additional sheets belong to a single sheet, such that the overlap is configured from a hem formed in said single sheet.

Examples of thermoplastic materials that can be used are: PVC, PU, PTFE, PE, PP, PS, PMMA, PET and PA.

On the other hand, the apparatus for forming an overlap by welding sheets according to the described method is characterized in that it comprises: main sheet heat transfer means for heating the main sheet outer surface; and additional sheet heat transfer means independent of the main sheet heat transfer means for heating the additional sheet outer surface. The apparatus can additionally include compression means for applying pressure on the outer surfaces.

The heat transfer means can be contact or thermal radiation heat transfer means. In turn, the contact heat transfer means can be direct contact (e.g. hot surface) or indirect (e.g. hot air/gas) heat transfer means. An example of thermal radiation heat transfer means is infrared heat transfer means. On the other hand, the compression means can be static (e.g. by a press or vacuum bag) or dynamic (e.g. by a moving roller) compression means.

In one embodiment of the apparatus of the invention, the apparatus incorporates a workbench on which the main sheet and the additional sheet overlaid on one another are placed. Optionally, the compression means comprise a press with a press base prepared for holding down the outer surface of the sheet located on top of the other sheet on the workbench. In the same embodiment, the workbench and the press incorporate independent heat transfer means in correspondence with the main sheet and the additional sheet, respectively.

The incorporation of a clamp with the function of holding the sheets in a fixed position on the workbench while welding is optionally contemplated.

It is also contemplated that the heat transfer means are distributed such that there are no sharp temperature gradients in the overlap which can generate stress due to thermal expansion/shrinkage in the sheets.

It is additionally considered that the surface of the workbench on which the main or additional sheet is placed, as well as the surface of the press base, can incorporate a film of material that prevents adhesion of the sheets to said surfaces due to the effect of heating when welding. PTFE film can be used for this purpose.

The apparatus alternatively incorporates two presses with respective press bases prepared for holding down the main sheet and additional sheet outer surface, respectively, such that pressure is applied on the outer surfaces of the sheets by moving the presses between which the sheets are placed closer to one another. Similar to the aforementioned embodiment, the two presses incorporate different heat transfer means in correspondence with the main and additional sheet, respectively, as well as a film of material that prevents adhesion of the sheets.

In a preferred configuration of the apparatus of the invention, the apparatus incorporates hot surface heat transfer means with an electric resistance. To that end, the apparatus comprises a main sheet heating rod and an additional sheet heating rod. In a first embodiment, one of the rods is incorporated in the workbench whereas the other one is incorporated in the press. In another embodiment in which the apparatus of the invention comprises two presses which are moved closer to one another to perform welding, the heating rods are arranged in the respective presses. Each of the rods extends along the overlap length and preferably comprises a resistant support structure such as an aluminum section (e.g. duralumin section), to which there is coupled an electric resistance in the form of a strip of conductive material (e.g. copper or steel), and between the resistance and the section there is arranged an elastic band (e.g. rubber band) with the main function of adapting the rod to the overlap while holding it down as well as to possible geometric irregularities of the resistance. The entire assembly is coated with a film of PTFE. The electric resistance contacts the rubber but it preferably does not become attached to it such that it can freely slide on the rubber as the result of the expansion it experiences while heating it during welding. The PFTE film is fixed to the assembly by means of conventional PFTE film fixing means such as mechanical fixing means (e.g. adhesive, screws). On the other hand, the resistance in the form of a strip can be coupled to the support structure at the ends of the strip (preferably outside the overlap length to prevent interference therewith) by means of tension means comprising springs to absorb the expansion/shrinkage of the resistance during welding.

In a general case, the press bases are preferably formed by a smooth surface extending on the entire overlap surface but it can include embossments or projections to adapt the finish of the outer surface as may be required.

It is finally contemplated that the apparatus is provided with temperature measurement devices and optionally with pressure measurement devices for the main sheet and the additional sheet outer surface.

The incorporation of different heat transfer power regulating devices for the main sheet and the additional sheet respectively is also considered. The power regulating devices can include devices that regulate temperature by means of heating timing devices. An example of a heating timing device can be found in patent document GB-1376324. The heating timing devices for the apparatus of the invention preferably include TRIACs. TRIACS have the function of switching the alternating feed current of the heat transfer means depending on a cyclic heating control signal, each cycle of said control signal includes a pulse train, as many pulses as there are heating sectors of each cycle (cooling takes place during the remainder of the cycle). It is therefore possible to select the calorific value or the temperature by setting the number of pulses of each cycle. The calorific value or the temperature and therefore the number of pulses or the period of the cycle are determined according to the thickness or grammage and the material of the sheets.

The apparatus can be provided with a heating timing device for the main sheet (with main sheet TRIAC) and an independent heating timing device for the additional sheet (with additional sheet TRIAC), which allows suitably controlling the heating time of each of the sheets separately.

It is additionally contemplated that the apparatus of the invention can also include control means for controlling the temperature and pressure in different areas of each of the outer surfaces of the sheets of the overlap, such that it allows assuring uniform temperature and pressure distribution over the surfaces.

Finally, and as previously mentioned, both the method and the apparatus of the invention are particularly useful for being applied to manufacturing a roller shade. However, the method and apparatus of the invention can generally be useful in manufacturing any other type of shades, awnings, parasols, canvases for covering facades, etc., also for obtaining reinforcement bands, protective side edging therein and plastic section or zipper attachments.

Said roller shade to which the invention is particularly applied comprises: a main sheet of the shade which can be rolled up in a roller located in a top part of the shade and from which the sheet hangs; and a counterweight suspended from a bottom part of the shade by means of counterweight holding means; the counterweight holding means comprising an additional sheet encircling the counterweight and fixed to the main sheet. The method comprises the steps of overlapping by welding the additional sheet and the main sheet according to a method as it has been described above; and placing the counterweight between the main sheet and the additional sheet. The case in which the main sheet and the additional sheet are integrated in a single sheet formed from a hem formed at the bottom end of said single sheet has also been envisaged. In this latter case, the method comprises the steps of: overlapping by welding the hem according to a method as it has been defined above; and placing the counterweight inside the hem of the single sheet.

In summary, the present invention provides a method and apparatus for forming overlaps by welding sheets such that the technical and aesthetic characteristics or properties thereof do not significantly vary on at least one of the outer surfaces. The invention further offers improvements with respect to the known state of the art as it has been described above. All these features therefore solve the technical problem considered.

DESCRIPTION OF THE DRAWINGS

To complement the description of the invention and for the purpose of aiding to better understand the technical features thereof, reference is made in the rest of the specification to the attached drawings, in which a practical embodiment of the invention and in reference to the prior art has been depicted by way of a non-limiting practical example.

In said drawings:

FIG. 4 shows the overlap between the main and additional sheets according to a top view of the main sheet (FIG. 4*a*) and another top view of the additional sheet (FIG. 4*b*).

The reference numbers used in the drawings are:
1: overlap
2: main sheet
3: main sheet contact surface
4: main sheet outer surface
5: additional sheet
6: additional sheet contact surface
7: additional sheet outer surface
8: single sheet
9: hem
10: counterweight
11: heat transfer means
12: main sheet heat transfer means
13: additional sheet heat transfer means
14: compression means
15: workbench
16: press 17: roller
18: visor
19: window
20: press actuating means The following symbols and abbreviations are used in the drawings:
T: temperature
TA: ambient temperature
TC: critical temperature
TMm: minimum melting temperature
TFM: maximum melting temperature
I, II, III, IV and V: thermal gradient curves through the overlap thickness resulting from applying different methods.

DESCRIPTION OF AN EMBODIMENT OF THE INVENTION

Figure 1:
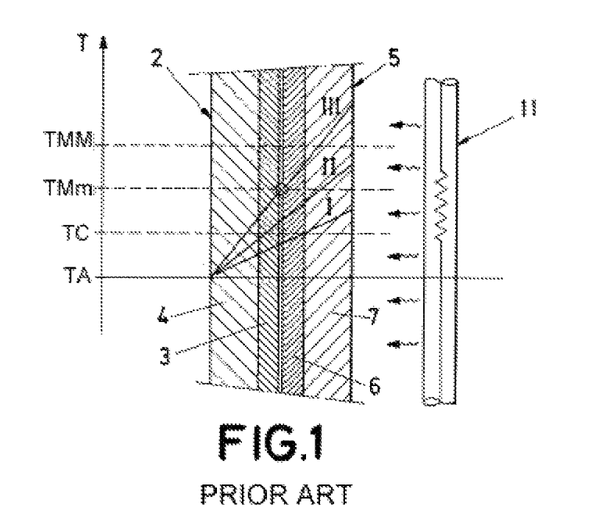
FIG. 1 is a diagram depicting a first method known in the state of the art for forming an overlap by welding sheets.
Figure 2:
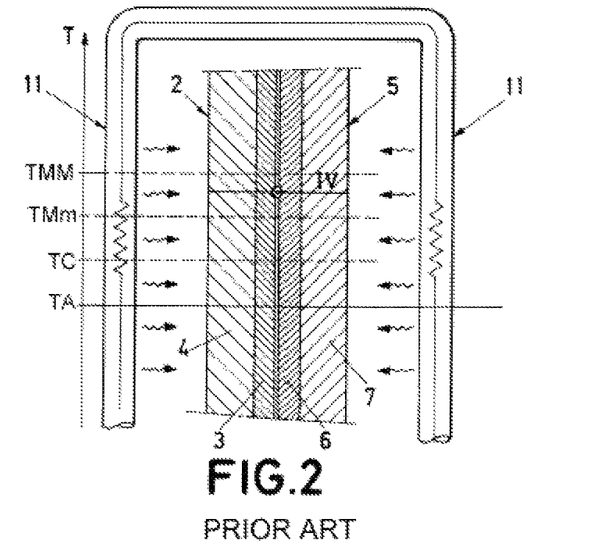
FIG. 2 is a diagram depicting a second method known in the state of the art for forming an overlap by welding sheets.
Figure 3:
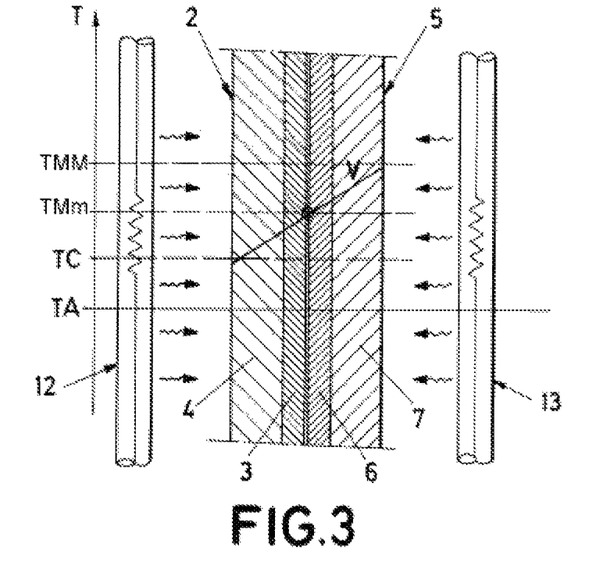
FIG. 3 is a diagram depicting a method for forming an overlap by welding sheets according to the present invention.

It has been considered appropriate to include in FIGS. 1 and 2 diagrams depicting different methods known in the state of the art for forming an overlap 1 by welding sheets 2,5. In contrast, FIG. 3 shows a diagram with the depiction of a method according to the present invention. These diagrams depict precisely the variation of temperature (T) or thermal gradient according to the thickness of the sheets in the overlap 1 in the step of heating for the method of welding of the invention.

FIG. 1 corresponds to a method of overlapping by heat welding a single outer surface 7. Said FIG. 1 shows three different thermal gradients (I, II and III) relating to different cases of heating that can occur and correspond to different calorific values selected for the heat transfer means 11. It can be observed that a calorific value that leads to establishing a thermal gradient according to III would be the only value from among the three presented that would allow carrying out the necessary melting in the contact area (Th≥TMm). For the remaining cases (I and II), T<TMm in the contact area, so the necessary melting temperature in said area would not be reached. However, even though III would allow melting, it would not be a valid method because T>TFM on the outer surface 7, so said outer surface 7 would degrade.

FIG. 2 can correspond to a method of overlapping by heat welding applied to the two outer surfaces 4,7 or also to a method of overlapping by dielectric welding. Said FIG. 2 shows that a step of heating with gradient IV can be effective to cause melting in the contact area (Th≥TMm), however the technical and aesthetic characteristics or properties of the outer surfaces 4,7 would be altered (T>TC). Therefore this method generally does not provide a valid solution to the technical problem considered either.

Finally, FIG. 3, illustrates a method of overlapping by welding according to the invention. As can be seen, there are heat transfer means 12,13 that provide a different calorific value in each of the two outer surfaces 4,7. This provides the capacity of being able to select a step of heating with gradient V. The melting in the contact area (T=TMm) necessary for the overlap therefore effectively occurs in addition to the fact that the additional sheet outer surface 7 does not degrade (T<TFM) and the technical and aesthetic characteristics and properties of the main sheet outer surface 4 remain unaltered (T<TC).

Figures 4A, 4B:
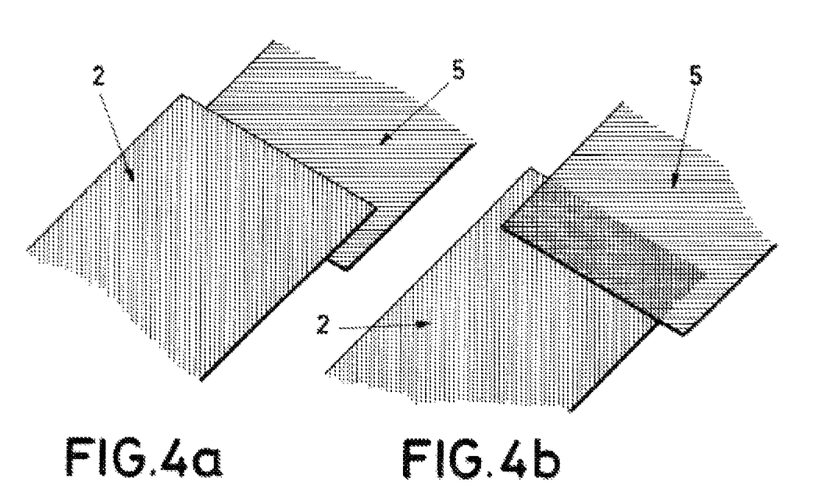

FIG. 4 shows the overlap 1 between the main and additional sheets 2,5 according to a top view of the main sheet 2 (FIG. 4a) and another top view of the additional sheet 5 (FIG. 4b). These figures illustrate the result of the overlap by heat welding of the invention where the main sheet outer surface 4 does not noticeably deteriorate.

Figure 5:
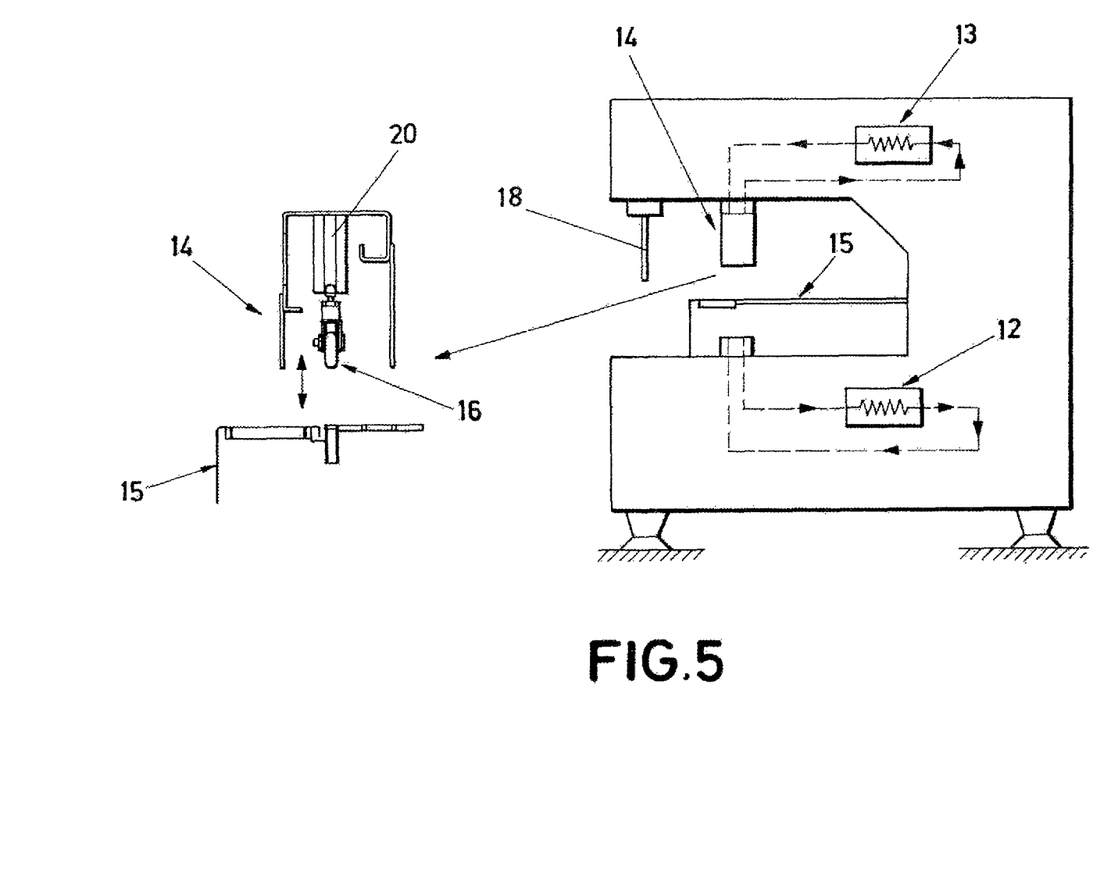
FIG. 5 schematically shows an elevational view of an apparatus for welding sheets according to invention.

FIG. 5 shows an apparatus that allows carrying out the method described according to a preferred embodiment of the invention. This FIG. 5 shows that the apparatus incorporates a workbench 15 on which the main sheet 2 and the additional sheet 5 overlaid on one another would be placed. As can be seen in the detail view, the apparatus is complemented with compression means 14 comprising a press 16 prepared for holding down the sheets 2,5 and thus applying compression while welding. The press 16 and the workbench 15 incorporate respective heating rods which are connected to independent heat transfer means 12,13. The apparatus optionally incorporates a visor 18 as a safety measure while operations are being performed with the apparatus and a clamp.

Figure 6:
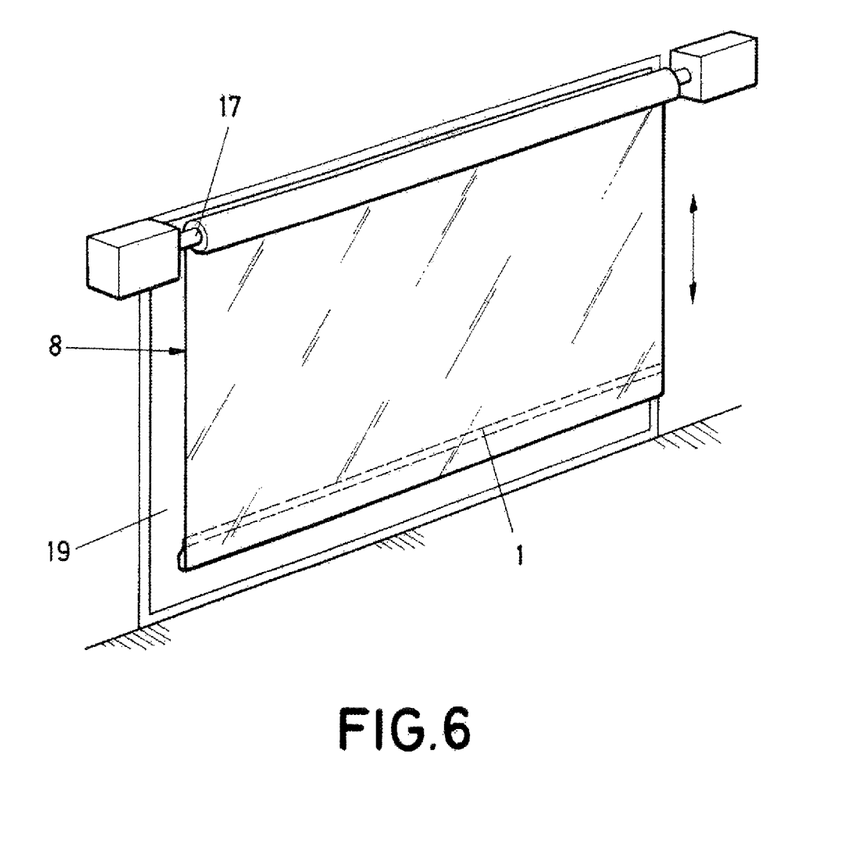
FIG. 6 illustrates a roller shade with a hem overlap obtained by welding sheets according to the invention.

As previously indicated, it has been envisaged that the method and the apparatus for forming overlaps by welding sheets according to the invention is particularly useful for manufacturing roller type shades, for example for windows 19. Such shades are illustrated in FIG. 6, as well as in FIGS. 7 and 8; the latter figures show details of the method of manufacturing the roller shade.

Figure 7:
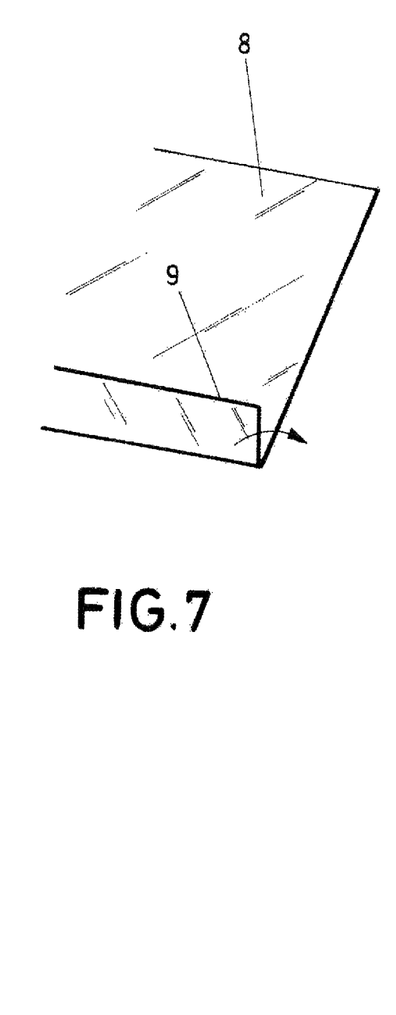
FIG. 7 depicts the hem of the roller shade to which the invention is applied.
Figure 8:
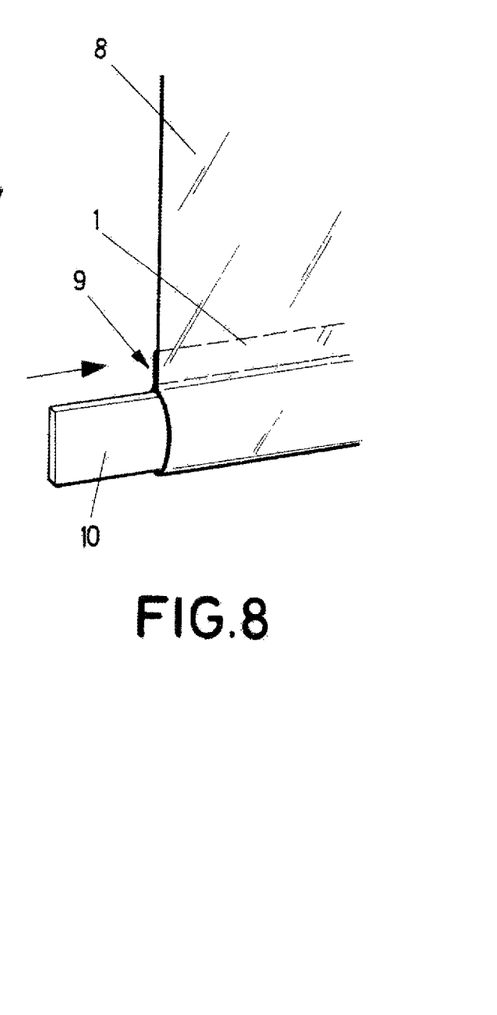
FIG. 8 depicts the step of placing the counterweight inside the hem to obtain the roller shade according to the invention.

In a preferred embodiment, the roller shade object of this invention incorporates a single sheet 8 which can be rolled up in a roller 17. A hem 9 in which a counterweight 10 is housed is formed at the bottom edge of said single sheet 8. The hem 9 laps the single sheet 8 by means of a described sheet welding process, creating an overlap 1.

For indicative and non-limiting purposes, the heating time for obtaining an overlap in a roller shade with an overlap width of 10 to 30 mm and with normal use powers (approximately 8 KW) in heat welding apparatuses is approximately 10 s, plus the 10 s duration for cooling.

The invention claimed is:

1. Method for forming an overlap by welding sheets, comprising the steps of:

placing a main sheet and an additional sheet overlaid on one another, connected to one another by means of a contact area; the contact area selected from the group consisting of: a main sheet contact surface, an additional sheet contact surface, a contact sheet and a combination thereof; the contact area being located on a contact side of each of the main sheet and additional sheet, wherein an outer surface of each of the main sheet and additional sheet is a surface of the respective main sheet and additional sheet on a side of the respective main sheet and additional sheet opposite the contact side of the respective main sheet and additional sheet;

heating the contact area to a melting temperature for melting same, applying pressure between the outer surfaces; and cooling;

wherein the contact area is made of a thermoplastic material and the main sheet outer having a main sheet critical temperature;

wherein the main sheet outer surface is heated to a temperature comprised within a temperature range that is higher than ambient temperature and less than or equal to the main sheet critical temperature;

wherein the additional sheet outer surface is heated to a temperature that is higher than a heating temperature of the main sheet outer surface and suitable for melting the contact area in a heating time; and wherein the additional sheet outer surface is heated to a temperature that is higher than the main sheet critical temperature and suitable for melting the contact area in the heating time.

2. The method for forming an overlap by welding sheets of claim 1, wherein the contact area comprises a material, the method characterized in that the additional sheet outer surface is heated to a temperature comprised within the temperature range that is higher than or equal to a minimum melting temperature of the material of the contact area and less than a maximum melting temperature of the material of the contact area.

3. The method for forming an overlap by welding sheets of claim 1, characterized in that the thermoplastic material of the contact area is selected from the group consisting of: PVC, PU, PTFE, PE, PP, PS, PMMA, PET and PA.

4. The method for forming an overlap by welding sheets of claim 1, characterized in that the main sheet and the additional sheet are integrated in a single sheet and are formed from a hem that is made in said single sheet.

* * * * *